Dec. 8, 1964     D. MANFREDI ETAL     3,160,374
AIRCHUTE AND EJECTION MEANS
Filed Dec. 11, 1962     2 Sheets-Sheet 2
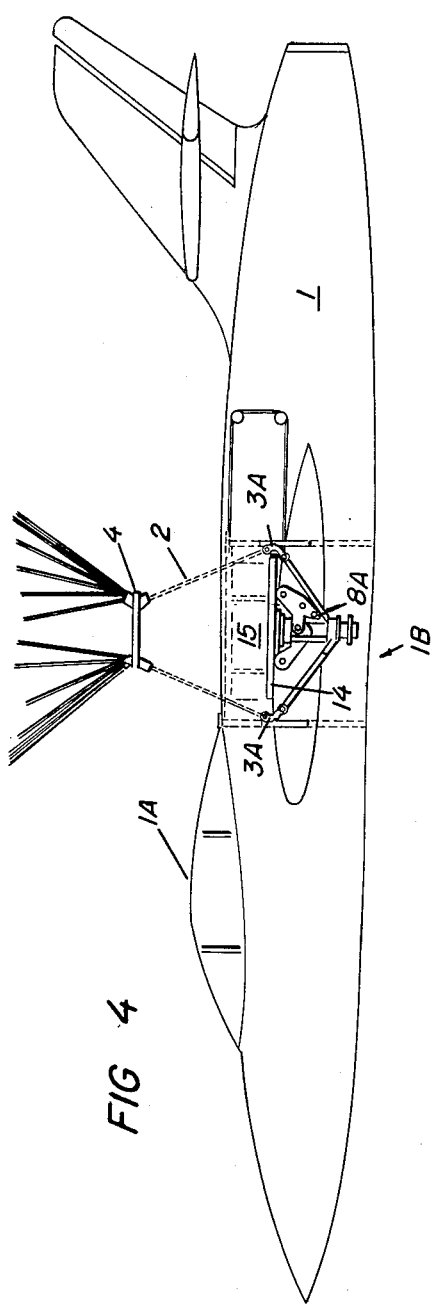
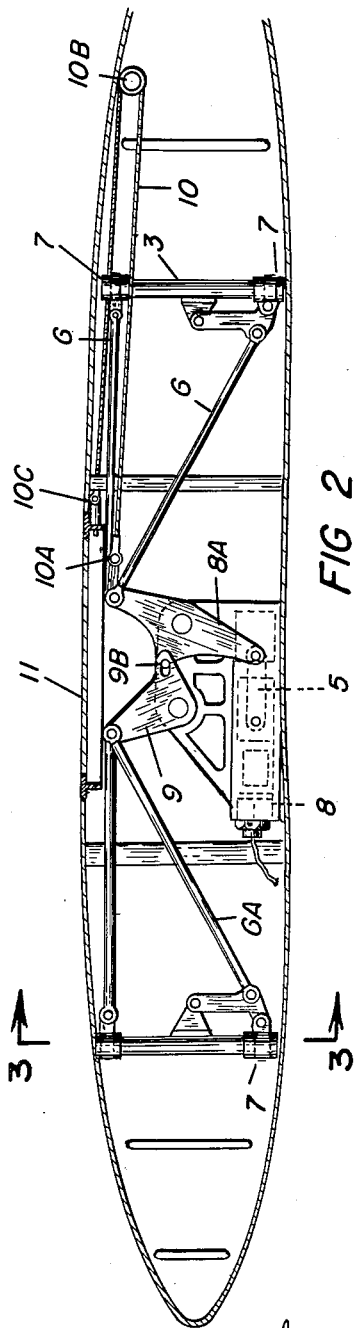
Inventors
Dario Manfredi
Angelo Raiti
By Peck & Peck
Attorneys

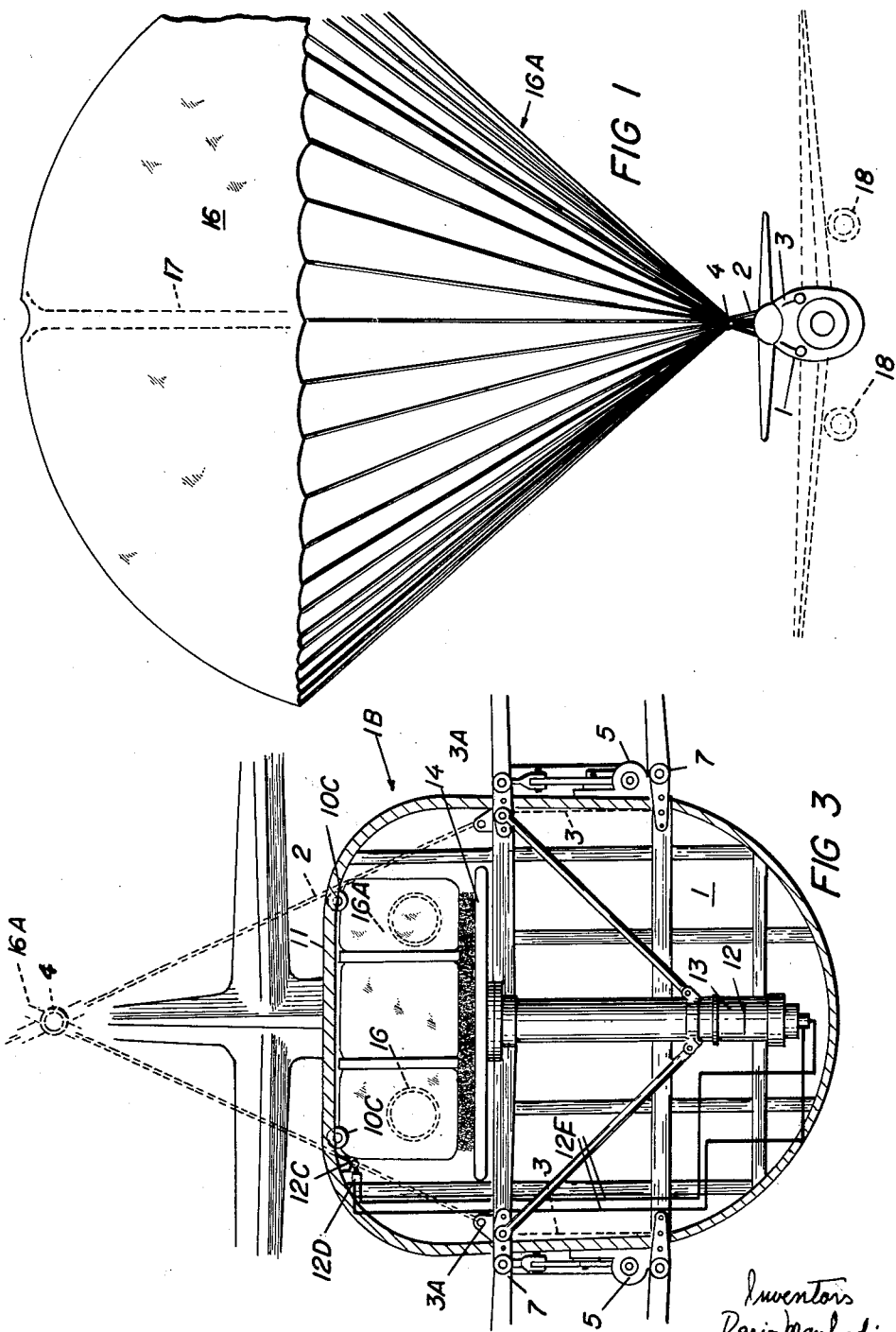

United States Patent Office 3,160,374
Patented Dec. 8, 1964

3,160,374
AIRCHUTE AND EJECTION MEANS
Dario Manfredi and Angelo Raiti, both of
110 Attorney St., New York 2, N.Y.
Filed Dec. 11, 1962, Ser. No. 243,758
5 Claims. (Cl. 244—138)

This invention relates to airchute and ejector safety means with our present development mainly directed to improvements based on our patent No. 2,665,093, filed February 9, 1950 and issued January 5, 1954.

Primarily, while our airchute release and ejector means for the removal of the wing containing fuel tanks, in emergency, is outlined to apply at present for small type commercial and military aircraft, it is contemplated that as the art and practice of airchute space vehicle recovery increases our development can be applied to larger design through the employment of one or multiple airchutes as presently applied for larger military and space vehicle airdrops.

While our earlier patent describes the safety advancement inherent to our development, great advancement since, has been made in airchute load capability and operating reliability, this to meet the more severe operating requirements of both military and commercial types, at higher speeds and great increase in operating altitude with the severe reduction of air pressure and temperature, making the release of aircraft personnel of exceptional hazard and restrictions. Further, the extensive service use of aircraft in the remote and frigid areas of the earth and largely over water makes the use of individual airchutes of much reduced value, as the requirements for survival under severe arctic, tropical or water conditions are not available.

With our safety development the entire crew section of the airplane with pressure temperature and survival control provisions are available, if emergency airchute release becomes necessary. This, because of blind weather conditions, fuel supply exhaustion, power failure, or due to mechanical defect, gunfire, or flak, in the case of military service types. Further, the main value of the airplane equipment may be saved.

With vertical descent the danger of bail-out from high speed aircraft without control and diving into populated areas at projectile velocity, is avoided. This condition has at times severely offset the life saving and safety value of individual airchute employment. For future development and application it is projected that the operational elements of the wing tank and airchute release means, as outlined, can be applied for space vehicle launching and crew recovery with great reduction of power required.

The propulsive rocket engine with fuel installed within the crew containing fuselage would be carried to stratospheric altitude by the conventional wings with fuel capacity for the air breathing jet engines installed thereon.

For return from space with reduced speed for atmospheric re-entry, the airchute ejector would be activated for normal descent at a rate of about twenty-five feet per second for ground contact.

The general idea with improvements provides for the installation of a compartment in the fuselage of the airplane for the enclosure of an airchute of sufficient area to provide for a normal descent. To expedite opening a cartridge operated synchronized piston ejects the chute in combination with gas expansion for the inflation of the airchute skirt with rib ducts in the canopy sides.

Synchronized therewith, cartridge operated units release the fuel containing wing panels for weight and fire hazard reduction. Flotation means will be provided for marine emergency and to cushion impact. The design features and operational detail of our invention will hereinafter appear.

FIG. 1 is a view of the airchute with a fighter plane attached of proportional size.

FIG. 2 is a side view of the wing fuel tank cartridge unit for wing pin attachment release and the wing root at the fuselage.

FIG. 3 is a view taken on line 3—3 of FIG. 2.

FIG. 4 is a side view of the combined installation.

In the accompanying drawings we have used the numeral 1 to designate the fuselage of, for instance, a fighter plane and 1A to describe the pilot's section of the airplane. As we have stated above the airplane is provided with a compartment designated in its entirety by the numeral 1B, this compartment being adapted to contain an airchute of sufficient area to provide for normal descent. The airchute 16 is provided with shrouds 16A which are attached to a bridle 2 by means of any suitable attachment such as 4. The bridle 2 being attached to the main wing roots 3 by fittings 3A.

In FIG. 2 we have illustrated the wing fuel tank release mechanism as involving the cartridge wing pin release unit 5 which releases the wing pins 7 through the action of tension rods 6. The cartridge ejector unit provides a piston pressure chamber 8, which on electric contact, actuated by the pilot of the airplane, explodes squids, thereby driving the main tiller element 8A which is connected to tiller 9 by a toggle connection 9B, so that the two tiller elements are driven in opposite directions. Thus, when the tiller elements are driven as described the rods 6 and 6A will be rapidly drawn inwardly toward the tiller elements for the rapid release of the attachment pins 7.

A cable 10 is connected to the tiller element 8A as at 10A and is actuated thereby when the tiller element is operated by the piston. The cable 10 extends about a pulley 10B and is operatively connected to a latch mechanism 10C which is operable to release the compartment cover 11. It will be clear that any suitable latch mechanism may be used, in the example shown we use a pair of latch pins 10C which are operated by the cable 10. It will thus be apparent that when the pins 7 are released the cover 11 will be simultaneously released. The compartment 1B is located in the section of the airplane body for best design conditions and for the airchute ejector unit, as disclosed in FIG. 3.

As we have explained the airchute compartment cover 11 is released by operation of the cable 10, and when this occurs by means which we are about to explain the parachute is ejected. A lug or the like element 12C is fixed to and depends from the underside of the cover 11 and when the cover is closed engages an electric switch 12D to keep said switch open. The electric switch is electrically connected by cables 12E with a powder charge of any suitable type which is contained in cylinder 13 to drive the piston 12. Thus, when the switch 12D is closed when the cover 11 opens and lug 12C is disengaged from the switch, the charge is ignited and generates gas pressure within the cylinder 13 to move the platform 14 forwardly, or vertically. We provide a platform 14 which is mounted on piston 12 so that the drive stroke of the piston will eject or move the platform vertically. Since the airchute package is supported on the platform 14 it will be ejected from the aircraft and the airchute 16 will be opened. To further expedite opening from low altitudes high pressure gas container 16A inflates annular and skirt ducts in the airchute canopy 17, as fully disclosed in our issued patent referred to above.

With engines 18 installed on the wings as heretofore described for prospective launching of space vehicles from great altitude, the wing release mechanism of FIG. 2, would of course, operate independent of the airchute ejector which would follow atmospheric re-entry for equipment and crew recovery.

Variations within the spirit and scope of our invention as disclosed in the foregoing specification will, and are intended to fall within the following claims.

We claim:

1. A wing release and airchute ejector device for an airplane having a compartment therein and provided with wings attached to the airplanes at multiple attachment points, including in combination, a cartridge pressure piston driving toggle, tiller drives connected thereto for tension in opposite directions, said tiller drives being connected to the multiple attachment points for the release of the wings from the airplane, and a cover for said compartment, latch means for said cover and means connected to said latch means and to one of said tiller drives and actuated by the latter to operate the latch means to open the cover for ejection of the airchute.

2. An airplane having wings fixed to the airplane at their roots by fittings and said airplane having an airchute compartment, an airchute stored therein, shroud lines fixed to the airchute and extending therefrom and anchored at the wing root attachment fittings for close center of gravity location for the airchute, means for ejecting said airchute and further means for effecting wing and fuel tank release, and mechanism connected to said means and said further means causing simultaneous airchute ejection and wing and fuel tank release.

3. An airplane having wings and provided with a canopy inflation airchute, a stowage compartment for the airchute and closure means normally closing said compartment, means for ejecting the airchute therefrom when the closure means are opened, a cartridge ejector, mechanism connected with said cartridge ejector and with the wings and operable by said cartridge ejector for releasing the wings of the airplane, further means connected with said mechanism and with said closure means and operable by said mechanism to open said closure means for ejection of said airchute upon operation of said closure means by said means, for ejecting the airchute.

4. An airplane in accordance with claim 3, wherein means are provided for connecting said closure means with said means for ejecting said airchute and are operated when said closure means are opened.

5. An airplane in accordance with claim 4 wherein said means for connecting the closure means with the means for ejecting the airchute comprise electrical means.

References Cited in the file of this patent

UNITED STATES PATENTS

| | | |
|---|---|---|
| 2,665,093 | Manfredi | Jan. 5, 1954 |
| 2,910,255 | Johnson | Oct. 27, 1959 |
| 3,051,420 | Novak | Aug. 28, 1962 |